United States Patent
Kato (10) Patent No.: US 11,022,676 B2
(45) Date of Patent: Jun. 1, 2021

(54) FILTER APPARATUS AND TARGET DETECTION APPARATUS

(71) Applicant: DENSO CORPORATION, Kariya (JP)

(72) Inventor: Yusuke Kato, Kariya (JP)

(73) Assignee: DENSO CORPORATION, Kariya (JP)

( * ) Notice: Subject to any disclaimer, the term of this patent is extended or adjusted under 35 U.S.C. 154(b) by 837 days.

(21) Appl. No.: 15/509,822

(22) PCT Filed: Sep. 1, 2015

(86) PCT No.: PCT/JP2015/074889
§ 371 (c)(1),
(2) Date: Mar. 8, 2017

(87) PCT Pub. No.: WO2016/039230
PCT Pub. Date: Mar. 17, 2016

(65) Prior Publication Data
US 2017/0261598 A1  Sep. 14, 2017

(30) Foreign Application Priority Data

Sep. 12, 2014  (JP) .............................. JP2014-186460

(51) Int. Cl.
*G01S 7/35* (2006.01)
*G01S 13/931* (2020.01)
(Continued)

(52) U.S. Cl.
CPC .............. *G01S 7/35* (2013.01); *G01S 7/4008* (2013.01); *G01S 13/345* (2013.01);
(Continued)

(58) Field of Classification Search
CPC ....................................................... G01S 7/35
(Continued)

(56) References Cited

U.S. PATENT DOCUMENTS 5,777,574 A * 7/1998 Robinson ................ G01S 7/282
                                                        342/201
6,246,286 B1 * 6/2001 Persson .................. H03F 1/3241
                                                        330/136
(Continued)

FOREIGN PATENT DOCUMENTS

| JP | H05-327511 A | 12/1993 |
| JP | H11-231045 A | 8/1999 |
| JP | 2009-213007 A | 9/2009 |

OTHER PUBLICATIONS

Schuster "Signal Model and Linearization for Nonlinear Chirps in FMCW Radar SAW-ID Tag Request", IEEE Transactions on Microwave Theory and Techniques, vol. 54, No. 4, Apr. 2006 (Year: 2006).*

*Primary Examiner* — Erin F Heard
*Assistant Examiner* — Helena H Seraydaryan
(74) *Attorney, Agent, or Firm* — Maschoff Brennan (57) ABSTRACT

A filter apparatus has a first filter and a second filter. The first filter receives at least an up signal of a non-linear signal of which a single cycle is a predetermined period that includes an up interval and a down interval. In the up interval, a signal level non-linearly rises along a time axis. In the down interval, the signal level non-linearly falls along the time axis. The up signal is a signal in the up interval of the non-linear signal. The first filter performs linearization of the received up signal by improving linearity of the received up signal. The second filter receives at least a down signal of the non-linear signal. The down signal is a signal in the down interval of the non-linear signal. The second filter performs linearization of the received down signal by improving linearity of the received down signal.

6 Claims, 3 Drawing Sheets

(51) Int. Cl.
*G01S 7/40* (2006.01)
*G01S 13/34* (2006.01)
*G01S 13/58* (2006.01)
*G01S 13/93* (2020.01)

(52) U.S. Cl.
CPC .......... *G01S 13/931* (2013.01); *G01S 13/584* (2013.01); *G01S 13/93* (2013.01)

(58) Field of Classification Search
USPC ........................................................ 342/200
See application file for complete search history.

(56) References Cited

U.S. PATENT DOCUMENTS

| | | | |
|---|---|---|---|
| 2009/0224963 A1 | 9/2009 | Nakanishi | |
| 2015/0369912 A1* | 12/2015 | Kishigami | ............... G01S 13/26 342/113 |
| 2017/0302304 A1* | 10/2017 | Muessener | ............ H03F 1/3247 |
| 2018/0031673 A1* | 2/2018 | Kim | .......................... G01S 7/35 |

* cited by examiner

(a) D/A OUTPUT (b) FILTER OUTPUT (c)

FIG.3

FILTER APPARATUS AND TARGET DETECTION APPARATUS

CROSS-REFERENCE TO RELATED APPLICATION

This application is a U.S. National Phase Application under 35 U.S.C. 371 of International Application No. PCT/JP2015/074889 filed on Sep. 1, 2015 and published in Japanese as WO 2016/039230 A1 on Mar. 17, 2016. This application is based on and claims the benefit of priority from Japanese Patent Application No. 2014-186460, filed Sep. 12, 2014. The entire disclosures of all of the above applications are incorporated herein by reference.

TECHNICAL FIELD

The present invention relates to a filter apparatus that is used in a target detection apparatus to generate a transmission signal and a target detection apparatus in which the filter apparatus is mounted.

BACKGROUND ART

As a target detection apparatus that is mounted to a vehicle, a frequency-modulated continuous-wave (FMCW)-type radar apparatus is known. In the FMCW-type radar apparatus, a transmission signal is emitted as a millimeter-waveband radio wave (also referred to, hereafter, as a "radar wave"). The transmission signal is frequency-modulated so as to have an up interval (upsweep or rising interval) during which the frequency gradually increases and a down interval (downsweep or falling interval) during which the frequency gradually decreases. A reflected wave that is the radar wave that has been reflected by a target and returned is then received by a reception antenna. Information (also referred to, hereafter, as "target information") related to the target, such as the distance to the target and the relative speed of the target, is detected through use of the reception signal and the transmission signal (refer to, for example, PTL 1).

In the FMCW-type radar apparatus, the transmission signal is generated based on a digital modulation command that indicates the frequency to be generated. That is, first, the modulation command is converted to an analog modulation signal by a digital-to-analog (D/A) converter. The modulation signal outputted from the D/A converter is, on the whole, an analog signal of which the voltage value periodically increases and decreases. However, a detailed view shows that the change in voltage value occurs in stages. Therefore, the modulation signal is linearized by a filter. Then, a voltage controlled oscillator generates a transmission signal of which the frequency changes based on the modulation signal outputted from the filter.

CITATION LIST

Patent Literature

[PTL 1] WO2008/072481

SUMMARY OF INVENTION

Technical Problem

In the FMCW-type radar apparatus, to detect the target information with high accuracy, both the up interval and the down interval of the transmission signal are preferably linearized by the filter. In this case, the accuracy of the detected target information decreases as linearity decreases, that is, as deviation from a straight line increases.

However, in actuality, the linearity of the waveforms of both intervals is insufficient. As one of the main reasons, the modulation signal from the D/A converter being filtered through use of the same filter for both the up interval and the down interval can be given. That is, achievement of linearity in both intervals is attempted by the same single filter. Therefore, as a result, linearization performance for both periods becomes incomplete, and sufficient linearity cannot be achieved in either interval.

The present invention has been achieved in light of the above-described issue. An object of the present invention is to provide a filter apparatus that is capable of generating, from a non-linear modulation signal that has an up interval and a down interval, a signal in which both intervals have sufficient linearity.

Solution to Problem

A first invention that has been achieved to solve the above-described issue is a filter apparatus that includes a first filter and a second filter. The first filter receives at least an up signal of a non-linear signal of which a single cycle is a predetermined period that includes an up interval and a down interval. In the up interval, a signal level non-linearly rises along a time axis. In the down interval, the signal level non-linearly falls along the time axis. The up signal is a signal in the up interval of the non-linear signal. The first filter performs linearization of the received up signal by improving linearity of the received up signal. The second filter receives at least a down signal of the non-linear signal. The down signal is a signal in the down interval of the non-linear signal. The second filter performs linearization of the received down signal by improving linearity of the received down signal. Linearization herein refers not only to complete linearization (straightening) in a mathematical sense, but is also a concept including relative improvement in linearity in relation to an original signal received by a filter.

In the filter apparatus configured in this manner, of the non-linear signal (non-linear modulation signal) of which a single cycle is the predetermined period including the up interval and the down interval, the signal in the up interval is linearized by the first filter and the signal in the down interval is linearized by the second filter. The first filter is not required to linearize the signal in the down interval and, therefore, is not required to have a function for linearizing the signal in the down interval. Consequently, as the first filter, a filter capable of favorably linearizing the signal in the up interval can be used without taking into consideration the signal in the down interval. Conversely, the second filter is not required to linearize the signal in the up interval and, therefore, is not required to have a function for linearizing the signal in the up interval. Consequently, as the second filter, a filter capable of favorably linearizing the signal in the down interval can be used without taking into consideration the signal in the up interval.

Therefore, in the filter apparatus configured as described above, from a non-linear signal (non-linear modulation signal) having an up interval and a down interval, a signal in which both intervals have sufficient linearity can be generated.

In addition, a second invention is a target detection apparatus that includes a signal generating unit, a first filter, a second filter, a transmitting unit, and an information generating unit. The signal generating unit generates a non-linear modulation signal of which a single cycle is a predetermined period that includes: an up interval in which a signal level non-linearly rises along a time axis; and a down interval in which the signal level non-linearly falls along the time axis. The first filter and the second filter have the same configurations as the filters included in the above-described filter apparatus. The transmitting unit generates a transmission signal of a frequency based on the signal levels of the output signals from the first filter and the second filter, and transmits the transmission signal from an antenna. The information generating unit receives, by an antenna, a reflected wave returned and reflected as a result of the transmission signal transmitted by the transmission unit being reflected, generates a beat signal based on a difference in frequency between a reception signal of the reflected wave and the transmission signal by mixing the reception signal and the transmission signal, and generates information related to a target that has reflected the transmission signal based on the generated beat signal.

In the target detection apparatus configured in this manner, the information related to a target is generated based on the transmission signal in which the non-linear modulation signals in both the up interval and the down interval are sufficiently linearized, and the reception signal received as a result of the transmission signal being reflected. Therefore, highly accurate target information can be acquired.

Reference numbers within the parentheses recited in the claims indicate corresponding relationships with specific means described according to an embodiment described hereafter as an aspect, and do not limit the technical scope of the present invention.

BRIEF DESCRIPTION OF DRAWINGS

In the accompanying drawings:

FIG. 2 illustrates, by (a), an explanatory diagram of a modulation signal that is D/A-converted by a D/A converter, by (b), an explanatory diagram of a waveform after the modulation signal is filtered by each filter and, by (c) an explanatory diagram of a relationship between a transmission signal and a reception signal (reflected wave)

DESCRIPTION OF EMBODIMENTS

Figure 1:
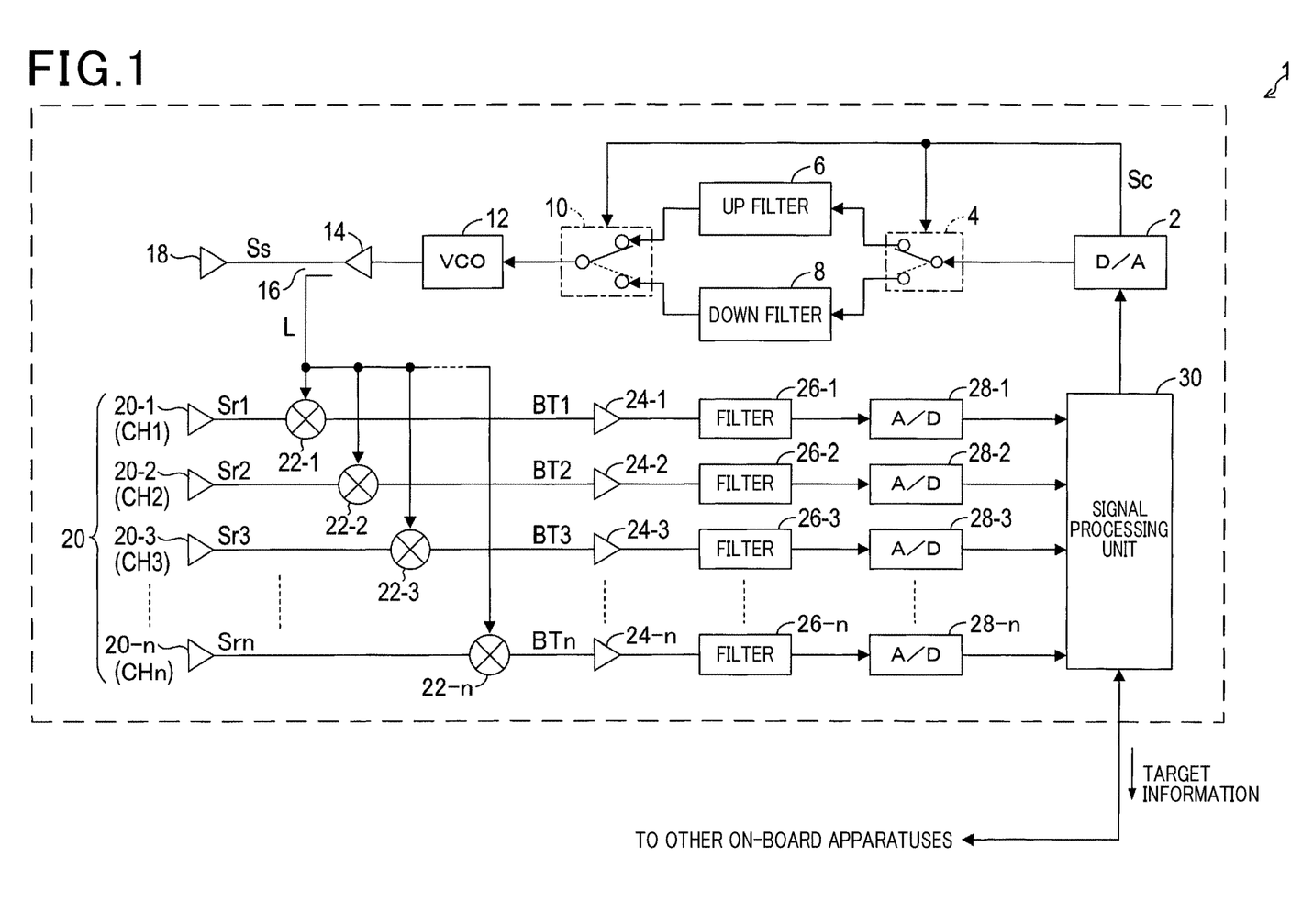
FIG. 1 is a block diagram of an overall configuration of a radar apparatus according to an embodiment.

A preferred embodiment of the present invention will hereinafter be described with reference to the drawings.
(1) Configuration of a Radar Apparatus A radar apparatus 1 according to the present embodiment shown in FIG. 1 is configured as a so-called "millimeter-wave radar" based on a FMCW system. The radar apparatus 1 is mounted to a vehicle. The radar apparatus 1 recognizes a target, such as a preceding vehicle or a roadside object, by transmitting and receiving millimeter-waveband radar waves that have been frequency-modulated. The radar apparatus 1 then generates target information that is information related to such recognized targets, and transmits the target information to another on-board apparatus. The target information includes distance to a recognized target, relative speed, orientation at which the recognized target is positioned, and the like.

As shown in FIG. 1, the radar apparatus 1 according to the present embodiment includes a signal processing unit 30, a D/A converter 2, a first switch 4, an up filter 6 (first filter), a down filter 8 (second filter), a second switch 10, a voltage controlled oscillator (VCO) 12, an amplifier 14, a distributor 16, and a transmission antenna 18.

Figure 2:
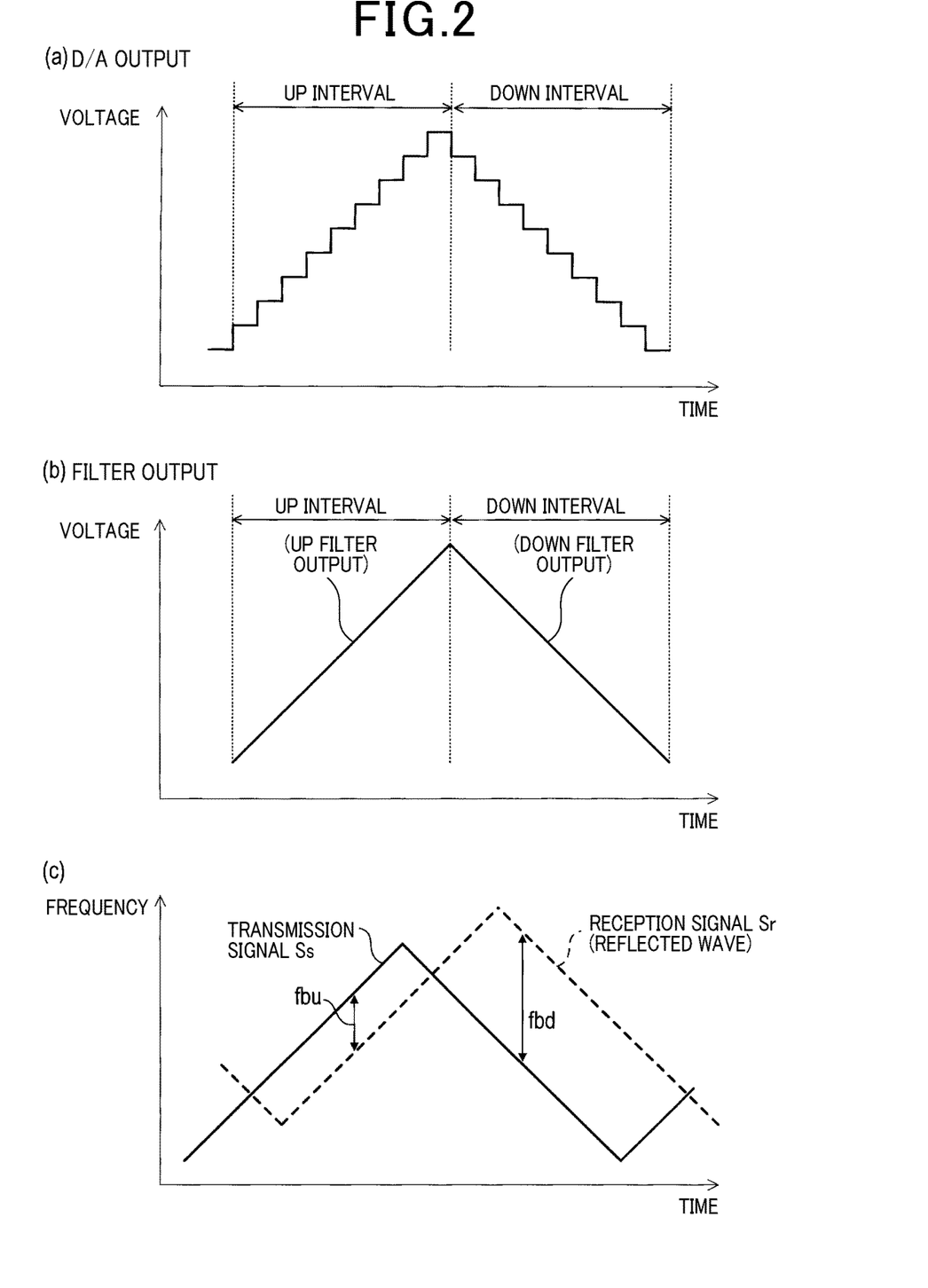

The D/A converter 2 performs D/A conversion of a digital modulation command value received from the signal processing unit 30 to an analog modulation signal. The modulation command value is a value that indicates the frequency of a transmission signal Ss to be transmitted from the transmission antenna 18. The modulation signal generated by the D/A converter 2 is not a linear signal, but rather a signal of which the voltage value changes in stages based on the modulation command value that changes in stages, as shown in the example in FIG. 2 by (a).

That is, according to the present embodiment, in the modulation command value outputted from the signal processing unit 30, a period during which the value periodically increases by a fixed value and a period during which the value periodically decreases by a fixed value are alternately repeated, such that a triangular wave-shaped radar wave is ultimately transmitted from the transmission antenna 18. The modulation command value in which an increasing period and a decreasing period alternately occur in this manner is D/A-converted by the D/A converter 2.

Therefore, a modulation signal that, on the whole, has an approximately triangular wave shape, such as that shown in the example in FIG. 2 by (a), is outputted from the D/A converter 2. The approximately triangular wave-shaped modulation signal has an up interval (rising interval) and a down interval (falling interval). The up interval is an interval during which the voltage value increases in stages (that is, the period during which the voltage command value periodically increases). The down interval is an interval during which the voltage value decreases in stages (that is, the period during which the modulation command value periodically decreases).

That is, the modulation signal outputted from the D/A converter 2 is a modulation signal that, on the whole, has an approximately triangular wave shape (though, in precise terms, non-linear), in which a single cycle is a period from the start of the up interval to the end of the down interval, and the cycle is periodically repeated.

The first switch 4 is a switch for selectively receiving the modulation signal generated by the D/A converter 2 to either of the up filter 6 and the down filter 8. When the first switch 4 is switched to the up filter 6 side, the modulation signal from the D/A converter 2 is received to the up filter 6. When the first switch 4 is switched to the down filter 8 side, the modulation signal from the D/A converter 2 is received to the down filter 8 side. The operation of the first switch 4 is controlled by a switch control signal Sc received from the D/A converter 2.

The D/A converter 2 outputs the switch control signal Sc for switching the first switch 4 to the up filter 6 side when the modulation signal generated and outputted by the D/A converter 2 itself is in the up interval. Meanwhile, the D/A converter 2 outputs the switch control signal Sc for switching the first switch 4 to the down filter 8 side when the modulation signal generated and outputted by the D/A converter 2 itself is in the down interval.

The up filter 6 is a filter (such as a low-pass) for removing high-frequency components from the modulation signal received from the D/A converter 2 via the first switch 4, and linearizing the waveform. As described hereafter, the modulation signal received to the up filter 6 is a modulation signal in the up interval. The up filter 6 has filter characteristics for an up signal (first filter characteristics) for performing linearization by improving the linearity of the signal in the up interval (referred to, hereafter, as an up signal), in particular, of the modulation signal outputted from the D/A converter 2 (see FIG. 2 by (a)), and linearize the up signal.

The down filter 8 is a filter (such as a low-pass filter) for removing high-frequency components from the modulation signal received from the D/A converter 2 via the first switch 4, and linearizing the waveform. As described hereafter, the modulation signal received to the down filter 8 is a modulation signal in the down interval. The down filter 8 has filter characteristics for a down signal (second filter characteristics) for performing linearization by improving the linearity of the signal in the down interval (referred to, hereafter, as a down signal), in particular, of the modulation signal outputted from the D/A converter 2 (see FIG. 2 by (a)), and linearize the down signal.

Figure 3:
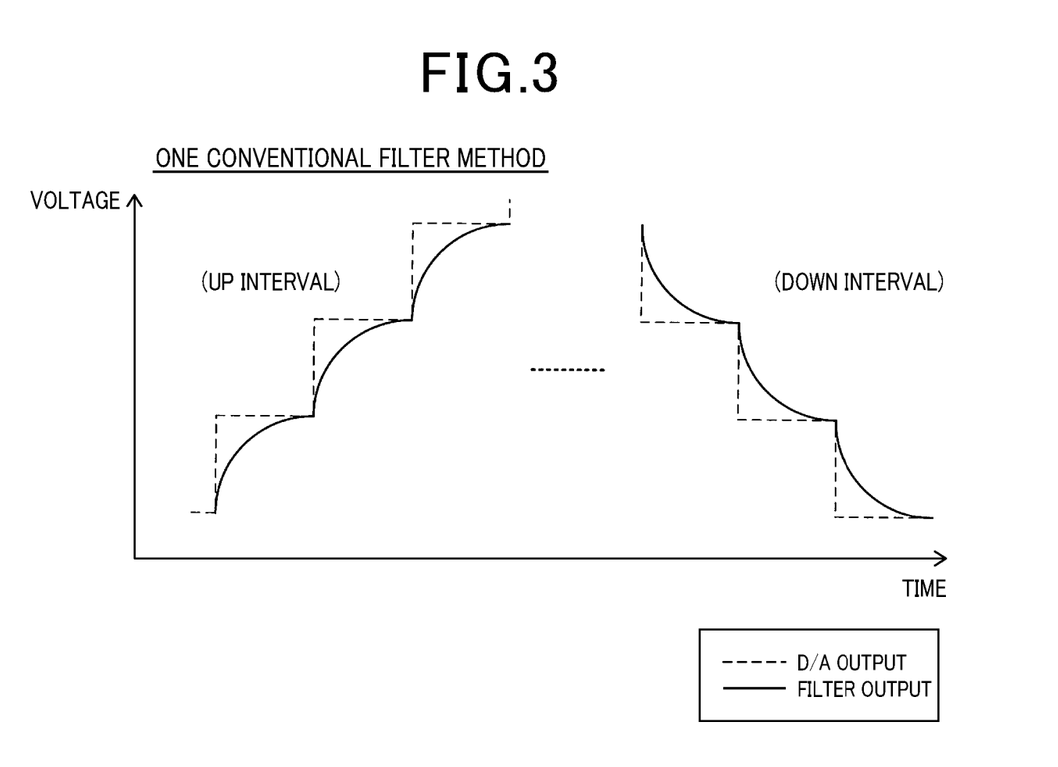
FIG. 3 is an explanatory diagram for explaining linearization performance of a modulation signal by a conventional filter.

As described above, in the conventional radar apparatus, the modulation signal outputted from the D/A converter is filtered by the same single filter. Therefore, as shown in the example in FIG. 3, sufficient linearity is not achieved in either the up signal or the down signal. In this regard, in the radar apparatus 1 according to the present embodiment, the up filter 6 for the up signal and the down filter 8 for the down signal are separately provided.

The up filter 6 is provided to linearize the up signal and is not used to filter the down signal. Therefore, the up filter 6 is configured as a filter that has filter characteristics for the up signal such that linearity in the up signal can be sufficiently achieved to the greatest extent possible, without taking into consideration linearization of the down signal. Therefore, during the up interval, the up signal outputted from the up filter 6 is a signal in which linearity is sufficiently achieved (ideally, completely linearized), as shown in the example in FIG. 2 by (b).

Meanwhile, the down filter 8 is provided to linearize the down signal and is not used to filter the up signal. Therefore, the down filter 8 is configured as a filter that has filter characteristics for the down signal such that linearity in the down signal can be sufficiently achieved to the greatest extent possible, without taking into consideration linearization of the up signal. Therefore, during the down interval, the down signal outputted from the down filter 8 is a signal in which linearity is sufficiently achieved (ideally, completely linearized), as shown in the example in FIG. 2 by (b).

The second switch 10 is a switch for selectively outputting, to the voltage controlled oscillator 12, either of the modulation signal linearized by the up filter 6 and the modulation signal linearized by the down filter 8. When the second switch 10 is switched to the up filter 6 side, the modulation signal from the up filter 6 is outputted to the voltage controlled oscillator 12. When the second switch 10 is switched to the down filter 8 side, the modulation signal from the down filter 8 is outputted to the voltage controlled oscillator 12. In a manner similar to the first switch 4, the operation of the second switch 10 is controlled by the switch control signal Sc received from the D/A converter 2.

The first switch 4 and the second switch 10 are switched to the same direction based on the same switch control signal Sc. That is, when a signal indicating switching to the up filter 6 side is received as the switch control signal Sc, both the first switch 4 and the second switch 10 switch to the up filter 6 side. In this case, the modulation signal outputted from the D/A converter 2 is received by the up filter 6 via the first switch 4, linearized by the up filter 6, and received by the voltage controlled oscillator 12 via the second switch 10.

Conversely, when a signal indicating switching to the down filter 8 side is received as the switch control signal Sc, both the first switch 4 and the second switch 10 switch to the down filter 8 side. In this case, the modulation signal outputted from the D/A converter 2 is received by the down filter 8 via the first switch 4, linearized by the down filter 8, and received by the voltage controlled oscillator 12 via the second switch 10. According to the present embodiment, both switches 4 and 10 are switched to the up filter 6 side when the modulation signal is in the up interval. Both switches 4 and 10 are switched to the down filter 8 side when the modulation signal is in the down interval.

The voltage controlled oscillator 12 generates a millimeter-waveband high-frequency signal of which the frequency changes based on the received modulation signal (analog voltage signal). As described above, the triangular wave-shaped modulation signal is received by the voltage controlled oscillator 12. Therefore, the high-frequency signal generated by the voltage controlled oscillator 12 is a triangular wave-shaped signal of which the frequency gradually increases and decreases in a linear manner in relation to time. However, in a precise sense, the linearity of the high-frequency signal is dependent on the linearity of the received modulation signal.

The amplifier 14 amplifies the high-frequency signal generated by the voltage controlled oscillator 12. The distributor 16 performs power distribution of the output of the amplifier 14 to the transmission signal Ss and a local signal L. The transmission antenna 18 emits a radar wave based on the transmission signal Ss.

In addition, the radar apparatus 1 includes a reception antenna unit 20. The reception antenna unit 20 receives a reflected wave that is the radar wave that has been transmitted from the transmission antenna 18, reflected by a target and returned. The reception antenna unit 20 is configured as a linear array antenna in which an n-number (n being an integer of 2 or more) of reception antennas 20-1 to 20-*n* (first reception antenna 20-1 to n-th reception antenna 20-*n*) is arrayed in a single row. The reception antennas 20-1 to 20-*n* are each set such that a beam width thereof includes an overall beam width of the transmission antenna 18. The reception antennas are respectively allocated to CH1 to CHn.

A mixer 22, an amplifier 24, a filter 26, and an analog-to-digital (A/D) converter 28 are individually provided for each of the n-number of reception antennas 20-1 to 20-*n*. Here, for convenience, the description will be continued with an arbitrary n-th reception antenna, among the first reception antenna 20-1 to n-th reception antenna 20-*n*, expressed as a reception antenna 20-*n*.

As shown in FIG. 1, an n-th mixer 22-*n*, an n-th amplifier 24-*n*, an n-th filter 26-*n*, and an n-th A/D converter 28-*n* are provided for the n-th reception antenna 20-*n*.

The n-th mixer 22-*n* mixes a reception signal Srn from the n-th reception antenna 20-*n* and the local signal L, and generates a beat signal BTn. The n-th amplifier 24-*n* amplifies the beat signal BTn generated by the n-th mixer 22-*n*. The n-th filter 26-*n* removes unnecessary signal components from the beat signal BTn amplified by the n-th amplifier 24-*n*. The n-th A/D converter 28-*n* samples the output signal of the n-th filter 26-*n*, and converts the sampled output signal to digital data. The n-th A/D converter 28-*n* then outputs the digital data to the signal processing unit 30.

The signal processing unit 30 performs various control processes, such as control to start/stop the D/A converter 2 and the voltage controlled oscillator 12, control of the first switch 4 and the second switch 10 via the D/A converter 2, signal processing using sampling data (digital data) of the beat signals BT1 to BTn received from the A/D converters 28-1 to 28-*n*, and a process for transmitting, to another on-board apparatus, information (target information) such as the position, relative speed, orientation and type, of a target ahead that is obtained by signal processing. The signal processing unit 30 is mainly configured by a known microcomputer and further includes a calculation processing apparatus (such as a digital signal processor (DSP)) for performing fast Fourier transform (FFT) and the like on data loaded via the A/D converters 28-1 to 28-*n*.

(2) Overview of the Operations of the Radar Apparatus

In the radar apparatus 1 according to the present embodiment configured in this manner, the D/A converter 2 and the voltage controlled oscillator 12 are started based on a command from the signal processing unit 30. Then, the high-frequency signal generated by the voltage controlled oscillator 12 and amplified by the amplifier 14 is distributed by the distributor 16 into the transmission signal Ss and the local signal L. Of the transmission signal Ss and the local signal L, the transmission signal Ss is emitted via the transmission antenna 18 as the radar wave.

The D/A converter 2 outputs the switch control signal Sc to the first switch 4 and the second switch 10 based on a command from the signal processing unit 30. Specifically, as described above, the D/A converter 2 outputs the switch control signal Sc for switching both switches 4 and 10 to the up filter 6 side during the up interval in the earlier half of a single modulation cycle of the radar wave. The D/A converter 2 then outputs the switch control signal Sc for switching both switches 4 and 10 to the down filter 8 side during the down interval in the latter half of the single modulation cycle of the radar wave. That is, the switches 4 and 10 are intermittently controlled by the signal processing unit 30. The signal processing unit 30 may directly output the switch control signal Sc to the switches 4 and 10.

The reflected wave that has been emitted from the transmission antenna 18, reflected by a target, and returned is received by each of the reception antennas 20-1 to 20-*n* configuring the reception antenna unit 20. The reception signal Srn received by the n-th reception antenna 20-*n* is received by the n-th mixer 22-*n*. Then, in the n-th mixer 22-*n*, the local signal L from the distributor 16 is mixed with the received reception signal Srn, and the beat signal BTn is generated. The beat signal BTn is amplified by the n-th amplifier 24-*n*. Unnecessary signal components are removed by the n-th filter 26-*n*. Subsequently, the beat signal BTn is sampled by the n-th A/D converter 28-*n* and loaded to the signal processing unit 30.

The signal processing unit 30 recognizes the target information using a known signal processing method, based on the data loaded from the A/D converters 28-1 to 28-*n*. The signal processing method by the signal processing unit 30 is well known. Therefore, a detailed description is omitted. However, for reference, the calculation principle regarding the distance to the target and the relative speed of the target will be described with reference to FIG. 2 by (c).

As shown in the example in FIG. 2 by (c), the reception signal Sr, indicated by a broken line, is assumed to be received in relation to the transmission signal Ss, indicated by a solid line. In this case, when the difference between the frequencies of the transmission and reception signals during the up interval is fbu, and the difference between the frequencies of the transmission and reception signals during the down interval is fbd, the distance to the target can be calculated based on the sum of fbu and fbd. The relative speed of the target can be calculated based on the difference between fbu and fbd. That is, various pieces of target information, such as the position and relative speed of the target, can be calculated through use of the transmission signal Ss and reception signal Sr in both the up interval and the down interval.

(3) Effects According to the Embodiment

In the radar apparatus 1 according to the present embodiment, of the non-linear modulation signal outputted from the D/A converter 2, the signal in the up interval is linearized by the up filter 6 and the signal in the down interval is linearized by the down filter 8. The up filter 6 has filter characteristics for the up signal such that the signal in the up interval can be sufficiently linearized, without taking into consideration linearization of the signal in the down interval. Conversely, the down filter 8 has filter characteristics for the down signal such that the signal in the down interval can be sufficiently linearized, without taking into consideration linearization of the signal in the up interval.

Therefore, in the radar apparatus 1 according to the present embodiment, a modulation signal in which both the signal in the up interval and the signal in the down interval have sufficient linearity is generated from the non-linear modulation signal outputted from the D/A converter 2.

In addition, because the modulation signal that has sufficient linearity is received by the voltage controlled oscillator 12, the transmission signal Ss and the local signal L outputted from the distributor 16 also become signals that have sufficient linearity. The beat signal BT is then generated based on the reception signal Sr that is received as a result of the transmission signal Ss having sufficient linearity in this manner being reflected by the target, and the local signal L that has sufficient linearity. The beat signal BT is then used in signal processing by the signal processing unit 30. Therefore, the target information can be detected with high accuracy in the signal processing unit 30.

In addition, according to the present embodiment, the output destination of the modulation signal outputted from the D/A converter 2 is switched to either of the up filter 6 and the down filter 8 by the first switch 4. The second switch 10 selects whether the output signal from the up filter 6 or the output signal from the down filter 8 is received by the voltage controlled oscillator 12. In addition, each operation of the switches 4 and 10 is performed by the switch control signal Sc from the signal processing unit 30 via the D/A converter 2. Specifically, both switches 4 and 10 are switched to the up filter 6 side during the up interval. Both switches 4 and 10 are switched to the down filter 8 side during the down interval. Therefore, filtering by the up filter 6 during the up interval and filtering by the down filter 8 during the down interval can be reliably actualized by a simple configuration.

Other Embodiments

An embodiment of the present invention is described above. However, the present invention is not limited to the above-described embodiment. Various aspects are possible.

(1) The up filter 6 and the down filter 8 can each be actualized by various configurations (such as a low-pass filter) as long as each filter has the desired filter characteristics (characteristics that enable sufficient linearity to be actualized and ideally enable complete linearization).

(2) According to the above-described embodiment, the propagation route of the modulation signal is switched through use of the two switches 4 and 10 to enable the up filter 6 to perform filtering during the up interval of the modulation signal outputted from the D/A converter 2 and the down filter 8 to perform filtering during the down interval. However, use of the two switches 4 and 10 in this way is not a requisite. As long as the up filter 6 is able to perform filtering during the up interval and the down filter 8 is able to perform filtering during the down interval, the modulation signal may be propagated through use of various other methods.

In addition, according to the above-described embodiment, the second switch 10 may be omitted. That is, the output from the up filter 6 and the output from the down filter 8 may be received by the voltage controlled oscillator 12 without passing through the switch. However, in this case, the circuit is preferably modified as appropriate, such that the output from one filter does not go around to the other filter.

(3) According to the above-described embodiment, the modulation signal, on the whole, has a triangular wave-shaped waveform. However, the shape of the modulation signal is not limited to the triangular wave shape. For example, another interval (such as an interval in which the value is fixed) may be present during a single cycle, in addition to the up interval and the down interval. In this case, the filter through which the signal of the other interval passes can be determined as appropriate. For example, the signal may pass through either of the up filter 6 and the down filter 8. Alternatively, a separate filter may be provided and the signal may pass through the filter. Alternatively, the signal may be received by the voltage controlled oscillator 12 without passing through a filter.

(4) Application of the present invention is not limited to the application to the radar apparatus 1, configured as shown in the example in FIG. 1. For example, the present invention can be applied to various purposes in which a non-linear signal having an up interval and a down interval is linearized through use of a filter.

In addition, even in cases in which the present invention is applied to a target detection apparatus, application is not limited to the radar apparatus 1 shown in the example in FIG. 1. The present invention can be applied to any type of target detection apparatus that is configured to detect target information using a modulation signal having an up interval and a down interval.

(5) Furthermore, the present invention is not limited to the specific means, structures, and the like described according to the above-described embodiment. Various aspects are possible without departing from the spirit of the present invention. For example, a function provided by a single constituent element according to the above-described embodiment may be dispersed as a plurality of constituent elements. Functions provided by a plurality of constituent elements may be integrated in a single constituent element.

In addition, at least a part of a configuration according to the above-described embodiments may be replaced by a publicly known configuration having a similar function. Furthermore, a part of a configuration according to the above-described embodiments may be omitted. Moreover, at least a part of a configuration according to an above-described embodiment may be added to or replace a configuration according to another above-described embodiment, or the like. All aspects included in the technical concept identified by the expressions recited in the claims can be applied to the embodiments of the present invention.

REFERENCE SIGNS LIST

1: radar apparatus
2: D/A converter
4: first switch
6: up filter
8: down filter
10: second switch
12: voltage controlled oscillator
14: amplifier
16: distributor
18: transmission antenna
20: reception antenna unit
22: mixer
24: amplifier
26: filter
28: A/D converter
30: signal processing unit

The invention claimed is:

1. A filter apparatus comprising:
a first filter that receives an up signal of a non-linear signal of which a single cycle is a predetermined period that includes: an up interval in which a signal level rises non-linearly along a time axis; and a down interval in which the signal level falls non-linearly along the time axis, the up signal being a signal in the up interval of the non-linear signal, the first filter performing linearization of the received up signal by improving linearity of the received up signal; and
a second filter that receives a down signal of the non-linear signal, the down signal being a signal in the down interval of the non-linear signal, the second filter performing linearization of the received down signal by improving linearity of the received down signal.

2. The filter apparatus according to claim 1, wherein:
the first filter has first filter characteristics for improving the linearity of the signal in the up interval of the non-linear signal; and
the second filter has second filter characteristics for improving the linearity of the signal in the down interval of the non-linear signal.

3. The filter apparatus according to claim 2, further comprising:
a first switch that receives the non-linear signal and selectively outputs the received non-linear signal to either of the first filter and the second filter;
a second switch that selectively outputs either of an output signal from the first filter or an output signal from the second filter; and
a switch control unit that controls both the first switch and the second switch to be switched to the first filter side while the non-linear signal is in the up interval such that the up signal of the non-linear signal is received in the first filter and the linearization of the up signal of the non-linear signal is performed in the first filter, and controls both the first switch and the second switch to be switched to the second filter side while the non-linear signal is in the down interval such that the down signal of the non-linear signal is received in the second filter and the linearization of the down signal of the non-linear signal is performed in the second filter.

4. A target detection apparatus comprising:
a signal generating unit that generates a non-linear modulation signal of which a single cycle is a predetermined period that includes: an up interval in which a signal level rises non-linearly along a time axis; and a down interval in which the signal level falls non-linearly along the time axis;
a first filter that receives an up signal that is a signal in the up interval of the non-linear modulation signal generated by the signal generating unit, and performs linearization of the received up signal by improving linearity of the received up signal;

a second filter that receives a down signal that is a signal in the down interval of the non-linear modulation signal generated by the signal generating unit, and performs linearization of the received down signal by improving linearity of the received down signal;

a transmitting unit that generates a transmission signal of a frequency based on the signal levels of output signals from the first filter and the second filter, and transmits the transmission signal from an antenna; and an information generating unit that receives, by an antenna, a reflected wave that returns as a result of the transmission signal transmitted by the transmission unit being reflected, generates a beat signal based on a difference in frequency between a reception signal of the reflected wave and the transmission signal by mixing the reception signal and the transmission signal, and generates information related to a target that has reflected the transmission signal based on the generated beat signal.

5. An operation method of a filter apparatus, the operation method comprising:

receiving, by a first filter, an up signal of a non-linear signal of which a single cycle is a predetermined period that includes an up interval and a down interval, the up interval being that in which a signal level rises non-linearly along a time axis, the down interval being that in which the signal level falls non-linearly along the time axis, the up signal being a signal in the up interval of the non-linear signal, and performing linearization of the received up signal by improving linearity of the received up signal; and receiving, by a second filter, a down signal that is a signal in the down interval of the non-linear signal, and performing linearization of the received down signal by improving linearity of the received down signal.

6. The filter apparatus according to claim 1, further comprising:

a first switch that receives the non-linear signal and selectively outputs the received non-linear signal to either of the first filter and the second filter;

a second switch that selectively outputs either of an output signal from the first filter or an output signal from the second filter; and a switch control unit that controls both the first switch and the second switch to be switched to a first filter side while the non-linear signal is in the up interval such that the up signal of the non-linear signal is received in the first filter and the linearization of the up signal of the non-linear signal is performed in the first filter, and controls both the first switch and the second switch to be switched to a second filter side while the non-linear signal is in the down interval such that the down signal of the non-linear signal is received in the second filter and the linearization of the down signal of the non-linear signal is performed in the second filter.

\* \* \* \* \*